United States Patent [19]

Hayashi

[11] Patent Number: 4,589,833
[45] Date of Patent: May 20, 1986

[54] DEVICE FOR FORMING BALLS OF PLASTIC MATERIAL

[75] Inventor: Torahiko Hayashi, Utsunomiya, Japan

[73] Assignee: Rheon Automatic Machinery Co., Ltd., Japan

[21] Appl. No.: 583,773

[22] Filed: Feb. 27, 1984

[51] Int. Cl.[4] ............................................. A21C 11/10
[52] U.S. Cl. .................................... 425/306; 264/141; 425/332
[58] Field of Search ................. 425/306, 332; 264/141

[56] References Cited

U.S. PATENT DOCUMENTS

| 3,351,026 | 11/1967 | Hayashi | 425/306 |
| 3,572,259 | 3/1971 | Hayashi | 425/132 |
| 3,615,147 | 10/1971 | Hayashi | 264/324 |

Primary Examiner—Jay H. Woo
Assistant Examiner—Timothy W. Heitbrink
Attorney, Agent, or Firm—Guy W. Shoup

[57] ABSTRACT

Device for forming plastic balls from a bar of plastic material. The bar is separated into balls one by one by a pair of circular cutters, each cutter being formed on its peripheral side surface with a cutting member consisting of plural number of spiral arcuate blades which are arranged within equi-angular ranges, respectively, extending along the peripheral side surface of the cutter.

5 Claims, 5 Drawing Figures

DEVICE FOR FORMING BALLS OF PLASTIC MATERIAL

BACKGROUND OF THE INVENTION

1. Field of the Invention

The present invention relates generally to a device for forming plastic balls from a bar of plastic material, and it also relates to a device for forming a ball of plastic material consisting of filler material, such as bean jam, fruit jam, cream, minced meat, chopped vegetables or other materials, encased in an envelope of plastic covering material, such as bread dough, rice dough or other malleable or plastic materials, from a bar formed of a sleeve consisting of a covering material surrounding a central core consisting of a filler material.

Particularly, the present invention concerns a device comprising a pair of identical circular cutters each having an improved cutting member on the peripheral side surface between the top and bottom planar surfaces thereof.

2. Description of the Prior Art

The device hitherto used for formation of the above-mentioned balls is disclosed, for instance, in U.S. Pat. No. 3,351,026, and comprises a pair of identical circular cutters, each with top and bottom planar surfaces and a peripheral side surface, which cutters are rotatable about their respective axes disposed vertically and parallel to each other. The cutters are arranged on the same level, with a predetermined gap therebetween, and each cutter is formed on the peripheral side surface thereof with a cutting member which consists of a single spiral blade extending along the peripheral side surface of the cutter such that the spiral blade starts at the upper end of the said peripheral side surface and terminates near the lower end thereof substantially under the starting point of the blade. The edge of the blade is blunted throughout its length and the radius of a surface of revolution formed by the edge of the blade about the vertical axis of the cutter increases gradually from the top to the bottom. The cutters are rotated at the same speed and in the same direction so that the cutting blades meeting in opposition to each other at the said gap are always at the same elevation.

A bar of plastic material is continuously supplied downwardly toward and into the gap between the rotating cutters, and is separated by the cutters to produce one ball after another in succession in such a way that one ball can be obtained for every one revolution of the cutters. It is preferable that the central axis of the bar supplied to the cutters coincides with the vertical line passing through the middle of the said gap.

SUMMARY OF THE INVENTION

An object of the present invention is to provide a device for forming a plural number of balls for each revolution of the cutters, thereby to obtain balls of plastic materials of good qualities in increased production efficiency in comparison with the known device mentioned above.

According to the present invention, said cutting member consists of a plural number of spiral arcuate blades which are arranged within equi-angular ranges, respectively, extending along the peripheral side surface of the cutter such that each of the spiral arcuate blades starting at the upper end of the said peripheral side surface terminates near the lower end of the said peripheral side surface substantially under the starting point of the adjacent spiral arcuate blade.

It will readily understood that two or more balls can be produced for every one revolution of the cutters by using the device of this invention having cutter members provided with the corresponding number of arcuate blades.

In the device of the present invention, the length of each spiral arcuate blade is shorter in comparison with that of the known device mentioned above, assuming that they are of the same size, since the cutting member in the present invention consists of a plural number of spiral arcuate blades, while the cutting member in the known device consists of a single spiral blade extending along the peripheral side surface of the cutter. Therefore, the area of contact of the cutter blade with the plastic covering material of the bar during the separation of the bar portions into balls, becomes smaller, and accordingly a contact pressure the material undergoes from the blades is so much reduced. As a result, production of good quality balls of plastic material is obtained with less damage. Such an effect is particularly remarkable when forming smaller balls.

DESCRIPTION OF THE PREFERRED EMBODIMENT

Figure 1:
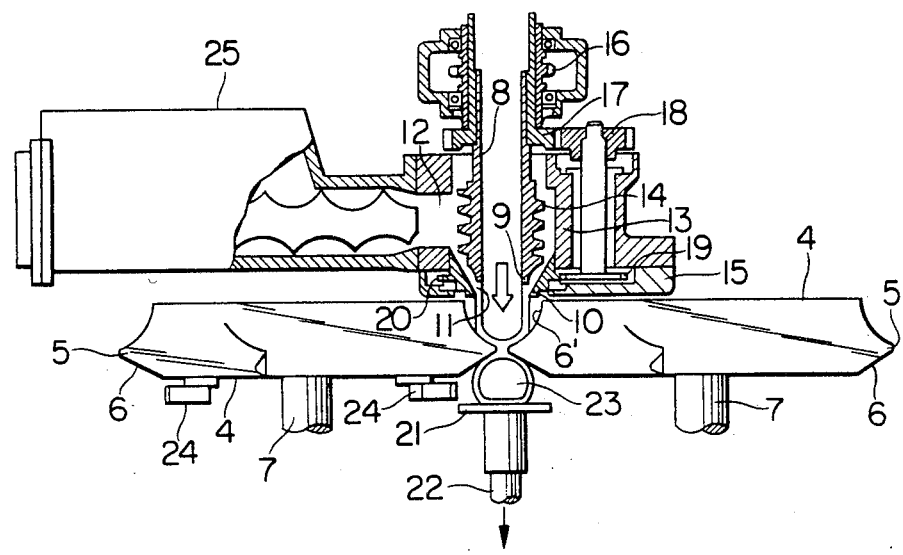
FIG. 1 is a partial view, in vertical section, of a ball forming device according to the present invention, including a device for forming a two-layered bar.

In FIG. 1, a pair of identical circular cutters (4, 4), each with top and bottom planar surfaces and peripheral side surface, are attached to respective shafts (7, 7) which are rotatable about their respective axes desposed vertically and parallel to each other. The cutters (4, 4) are arranged on the same level, with a predetermined gap therebetween.

Figure 5:
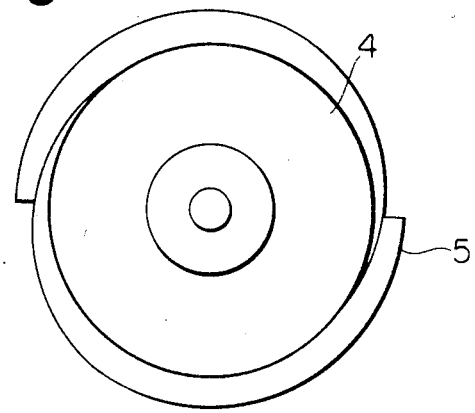
FIG. 5 is a plan view of a cutter of the present invention having two spiral arcuate blades.

Each cutter (4) is formed with a cutting member on the peripheral side surface, which member consists of two spiral arcuate blades (5), which are arranged within equiangular ranges, respectively, extending along the peripheral side surface of the cutter (4) (see FIG. 5) such that one of the spiral arcuate blades (5) starting at the upper end of the said peripheral side surface terminates near the lower end of the said peripheral side surface substantially under the starting point of the other spiral arcuate blade (5). The edge of the blade (5) is blunted throughout its length as will be seen from FIG. 1.

Figure 2:
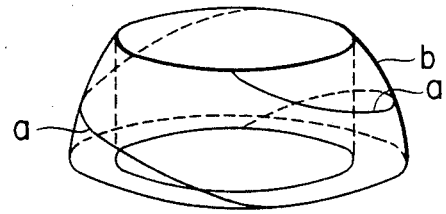
FIG. 2 is a diagrammatic view of a surface of revolution formed by the movement of the cutter blade edges of a cutter member of the present invention consisting of two spiral arcuate blades.
Figure 3:
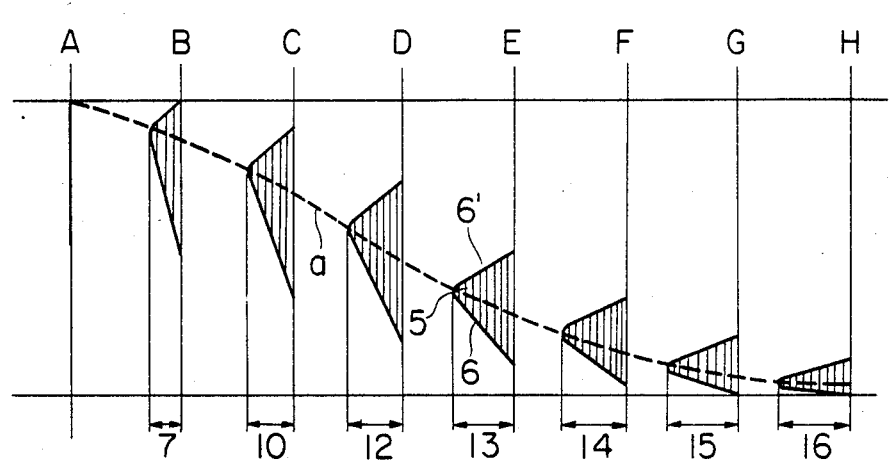
FIG. 3 is a diagrammatic view of the changing cross-sectional shape of a cutter blade of the present invention.
Figure 4:
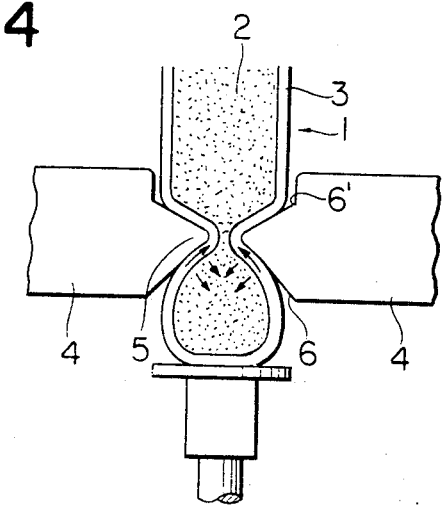
FIG. 4 is a view illustrating the function of the cutter of the present invention.

The radius of a surface of revolution formed by the edge of the blade (5) when the cutter (4) is rotated about its axis, increases gradually from the top to the bottom, as shown in FIG. 2. The reference letter (a) in FIGS. 2 and 3 shows a helix described by the outermost point of the blade edge. The reference letter (b) in FIG. 2 shows the above-mentioned surface of revolution.

The underside (6) of the blade (5) is generally a flat surface whose inclination gradually changes from substantially vertical at its top to substantially horizontal at its bottom, as will be understood from the illustration of FIG. 3, which is a diagrammatic view showing the changing cross-sectional shape and position at eight sections (A, B, C, D, E, F, G, H) of the cutter blade (5) taken along the axis of the cutter (4). The numerals described at the lower portion of FIG. 3 show rough ratios comparing the horizontal heights of the balde at the above-mentioned sections.

The upper side (6') of the blade (5) is preferably shaped to come into contact with a bar (1) only at a part thereof near the blunt edge of the blade (5).

The pair of cutters (4, 4) are rotated at the same speed and in the same direction so that the spiral arcuate blades (5, 5) meeting in opposition to each other at the said gap are always at the same elevation. The bar (1) is continuously fed downwardly toward and into the said gap between the rotating cutters (4, 4) with the central axis of the bar (1) as supplied being made to coincide with the vertical line passing through the middle of the gap between the cutters (4, 4).

The bar (1) consists of a sleeve consisting of a covering material (3) surrounding a central core consisting of a filler material (2). The bar (1) can be molded by a known apparatus shown in FIG. 1, which does not constitute part of the present invention and was disclosed in U.S. Pat. No. 3,615,147.

Therefore, the apparatus will be briefly explained merely with reference to its function of molding the bar (1). Core material (2) is forced from a supply device (not shown) into a rotary hollow pipe (8) which is rotated by a sprocket wheel (16). The pipe (8) imparts rotation to outer surface portions of the core material (2) while supplying it in a steady stream in the direction of cutters (4, 4).

Covering material (3) is forced from a supply device (25) through an inlet (12) into a cylinder (13), and is pushed downward in a tubular shape by a helical screw (14) which is attached to the exterior of the pipe (8). Then, the covering material (3) passes through an annular aperture (11) defined by a nozzle portion (9) of the pipe (8) and a rotary funnel-shaped ring (10) securely attached to the cylinder (13) by a fixture (15), and envelopes core material (2), thus forming a two-layered bar shape. When passing through this aperture, the covering material (3) is given a uniform thickness as well as rotation exactly equal to that of the outer surface portions of the core material (2), and thus the covering and core materials are forwarded to the cutters (4, 4) as one body.

The above-mentioned ring (10) is formed such that the inner diameter of the upper end thereof is identical to that of the cylinder (13) and the inner diameter of the lower end thereof is larger than that of the nozzle portion (9) to define said annular aperture as mentioned above.

The ring (10) is made to rotate by a gear mechanism comprising a gear (20) integral with the ring (10), a gear (19) meshing with the gear (20), a gear (18) attached to an end of a shaft to the other end of which the gear (19) is secured, and a gear (17) meshing with the gear (18). The gear (17) is integrally secured to the pipe (8).

A receiving dish (21) located under the cutters (4, 4) is adapted to move up and down through a shaft (22) which can be operated by a mechanism not shown. Articles (23) completed by the cutters (4, 4) are received by the dish (21), and transferred by pusher means (24) attached to the underside of one of the cutters (4) onto a conveying device such as a belt conveyor (not shown).

Such a discharging mechanism of the completed articles is also generally known and disclosed fully in U.S. Pat. No. 3,351,026 and U.S. Pat. No. 3,572,259, and therefore the details thereof should be referred, if necessary, to these patents, but the pusher means (24) in the present invention has a plural number of pusher arms corresponding to the number of spiral arcuate blades (5) of the cutter (4).

The manner of separation of balls from the bar will be explained briefly hereinbelow.

When the bar (1) fed toward the cutters (4, 4) is in contact with either of two spiral arcuate blades (5) on each of the cutters, the bar (1) is subjected to a composite rolling and squeezing motion by the pair of opposing blades (5, 5), whose spiral pattern is such as to reduce the separating gap between the two cutters to a predetermined dimension while descending, so that the bar is gradually constructed inwardly while being twisted. As a result, a top half of the ball is formed, while the upper sides (6') of the blades act to form the bottom half of the subsequent ball. The forward portion of the bar is separated from the rest when the blades take the lowermost position. Next, the other pair of opposing spiral arcuate blades (5) adjacent to the first-mentioned pair of blades (5) are brought into contact with the bar to form a top half of the subsequent ball in the same manner as stated above. This is different from the operation of the cutting member of the known device consisting of a single spiral blade in each cutter in that in the known device the single spiral blade itself functions to form the top half of the subsequent ball in cooperation with the opposing single spiral blade.

While the present invention has been described in connection with a preferred embodiment, it is to be understood that various modifications and improvements can be made therein without departing from the scope of the invention as disclosed in the appended claims. For instance, the number of spiral arcuate blades (5) on each cutter may be more than two. Furthermore, despite the emphasis herein on the formation of balls formed of a covering material surrounding a central core of another material, it should be understood that a device according to the invention may also be used to form balls of a single plastic material from a homogeneous bar of such material.

I claim:

1. A device for forming plastic balls from a bar of plastic material, comprising a pair of identical circular cutters, each with top and bottom planar surfaces and a peripheral side surface, which cutters are rotatable about their respective axes, said axes disposed vertically and parallel to each other, and where said cutters are arranged on the same level, with a predetermined gap therebetween, each cutter being formed with a cutting member on the peripheral side surface, said cutting member consisting of a plural number of spiral arcuate blades having an upperside and an underside, where said blades are arranged within equi-angular ranges offset over respective circumferential parts extending along the peripheral side surface of the cutter such that any of the spiral arcuate blades starting at an upper end of the said peripheral side surface terminates near a lower end of the said peripheral side surface substantially under the starting point of an adjacent spiral arcuate blade, the edge of the blade being blunted throughout said blades length, the radius of a surface of revolution formed by the edges of the blades about the vertical axis of each cutter increasing gradually from the top to the bottom, said cutters being rotated at the same speed and in the same direction so that the spiral arcuate blades meeting in opposition to each other at the said gap are always at the same elevation, whereby the bar supplied downwardly toward and into said gap is separated by the cutters into one ball after another in succession.

2. A device according to claim 1, wherein the underside of the blade is a generally flat surface whose inclination gradually changes from substantially vertical at said upper end to substantially horizontal at said lower end.

3. A device according to claim 2, wherein the upperside of the blade is shaped to come into contact with the bar only at a part thereof near the blunt edge of the blade.

4. A device according to any of the preceding claim 1, 2, or 3, wherein the central axis of the bar supplied to the cutters coincides with a vertical line passing through the middle of the gap between the cutters.

5. A device according to claim 1, wherein each of said spiral arcuate blades extends approximately around only half of the peripheral side surface of each of said cutters.

* * * * *